(12) United States Patent
Hoda

(10) Patent No.: US 7,786,690 B2
(45) Date of Patent: Aug. 31, 2010

(54) MOTOR CONTROL APPARATUS

(75) Inventor: Akihiko Hoda, Kashiwa (JP)

(73) Assignee: Oriental Motor Co., Ltd., Taito-Ku, Tokyo (JP)

( * ) Notice: Subject to any disclaimer, the term of this patent is extended or adjusted under 35 U.S.C. 154(b) by 408 days.

(21) Appl. No.: 11/840,820

(22) Filed: Aug. 17, 2007

(65) Prior Publication Data

US 2009/0045769 A1    Feb. 19, 2009

(51) Int. Cl.
*G05B 11/28*    (2006.01)

(52) U.S. Cl. .................... 318/599; 318/801

(58) Field of Classification Search ............. 318/696, 318/400.01, 400.14, 400.17, 400.09, 400.29, 318/400.23, 400.25, 775, 780, 801, 809, 318/811, 599, 685, 700
See application file for complete search history.

(56) References Cited

U.S. PATENT DOCUMENTS

| | | | |
|---|---|---|---|
| 5,194,796 A * | 3/1993 | Domeki et al. ............. 318/696 |
| 6,218,795 B1 * | 4/2001 | Syukuri ................. 318/400.17 |
| 6,324,085 B2 * | 11/2001 | Kimura et al. ............. 363/132 |
| 6,388,416 B1 * | 5/2002 | Nakatani et al. ........... 318/700 |
| 6,452,290 B1 * | 9/2002 | Yoshioka et al. ............. 307/82 |
| 6,456,030 B1 * | 9/2002 | Masaki et al. ............. 318/700 |
| 6,465,973 B1 * | 10/2002 | Kato et al. ............. 318/400.32 |
| 6,630,804 B2 * | 10/2003 | Moriya et al. ................. 318/85 |
| 6,674,258 B2 * | 1/2004 | Sakai et al. ............. 318/400.28 |
| 6,680,593 B2 * | 1/2004 | Gotou .................... 318/400.04 |
| 7,126,306 B2 * | 10/2006 | Sakamoto et al. ...... 318/400.17 |
| 7,166,975 B2 * | 1/2007 | Mori et al. ............. 318/400.36 |
| 7,288,916 B2 * | 10/2007 | Mitsuki ...................... 318/723 |
| 7,294,984 B2 * | 11/2007 | Urakabe et al. ............. 318/378 |
| 2009/0045769 A1 * | 2/2009 | Hoda .......................... 318/723 |

OTHER PUBLICATIONS

Albert C. Leenhouts, Step Motor System Design Handbook, Book, 1997, Second Edition, Chapter 2, pp. 5-12, Litchfield Engineering Co., U.S.A.

* cited by examiner

*Primary Examiner*—Walter Benson
*Assistant Examiner*—Antony M Paul
(74) *Attorney, Agent, or Firm*—Alston & Bird LLP

(57) ABSTRACT

The present invention restrains high frequency leakage current while reducing ripples of current flowing through a motor having one set and another set of independent phase windings. A plurality of inverter type drive means drives the respective phase windings and a PWM control means controls the respective inverter type drive means, by a switching sequence connecting one end of all phase windings including the other set to the negative side of the power supply when both ends of the phase winding included in one set are connected to the positive side of the power supply and connecting at least one end of all phase windings included in the other set to the positive side of the power supply when both ends of at least one phase winding included in one set are connected to the negative side of the power supply.

6 Claims, 19 Drawing Sheets

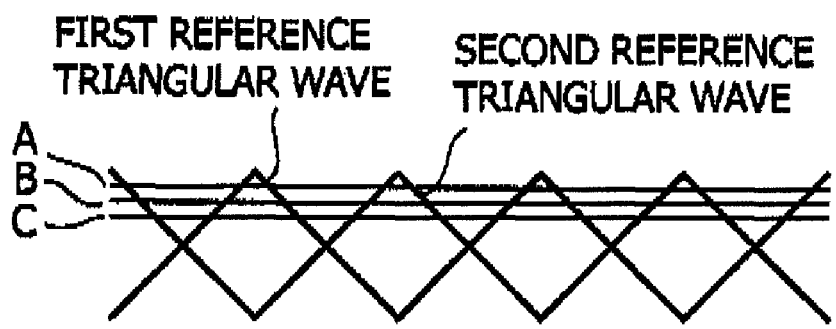
FIG.5(a)
FIG.5(b)
FIG.5(c)
FIG.5(d)
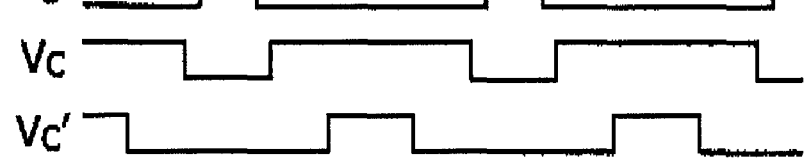
FIG.5(e)
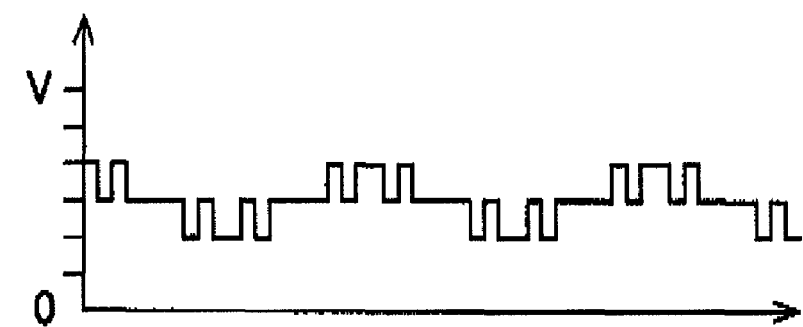

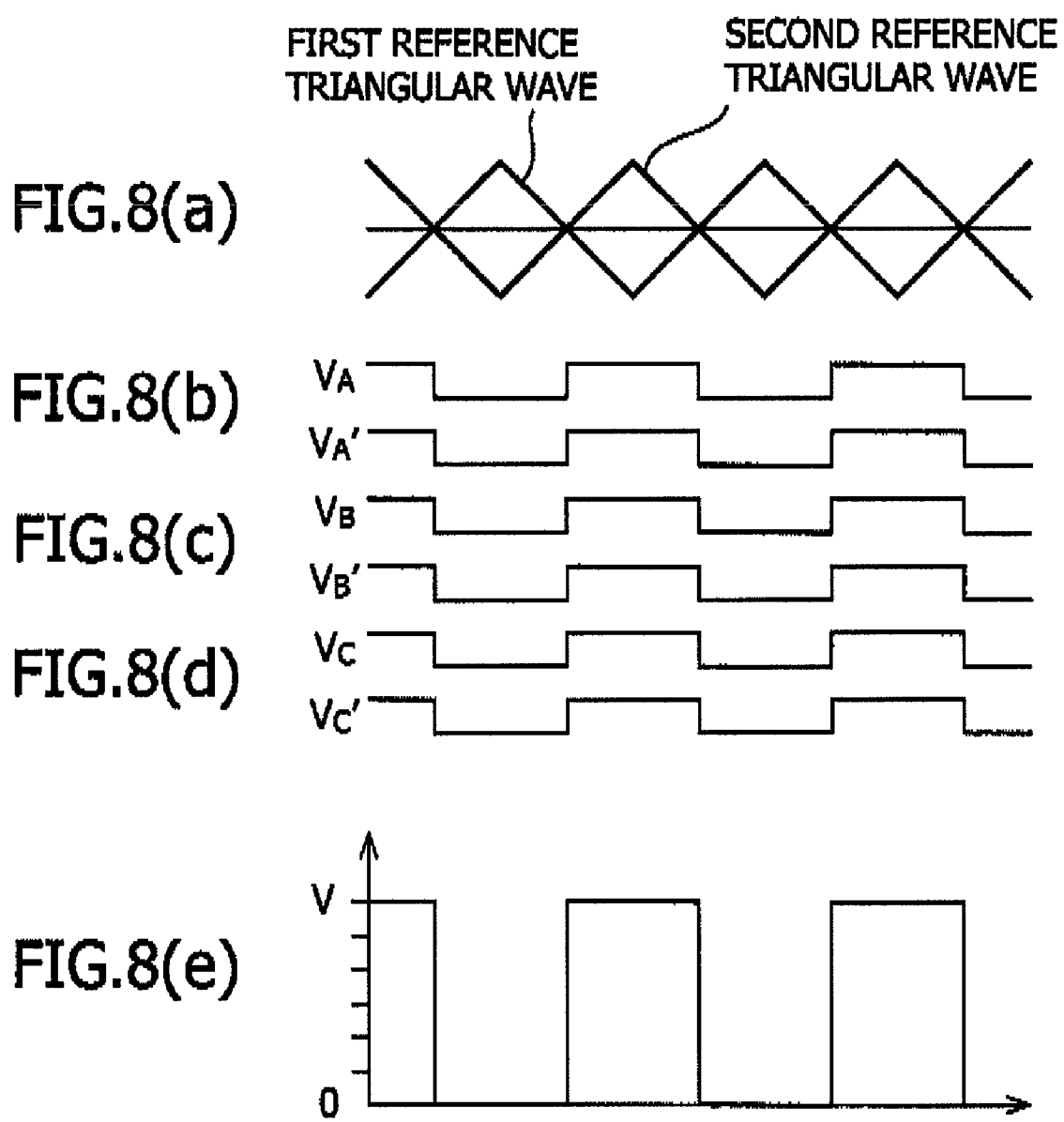

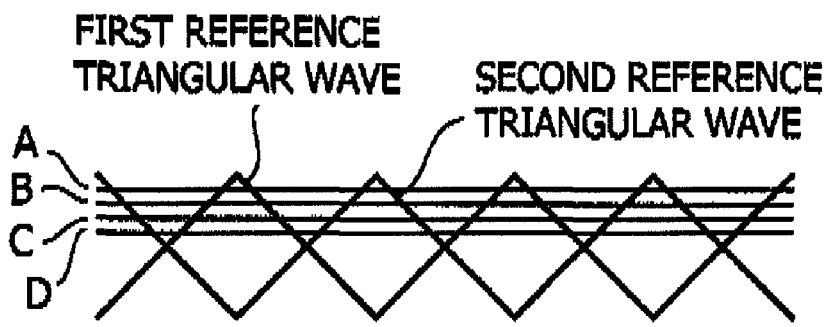
FIG.10(a)
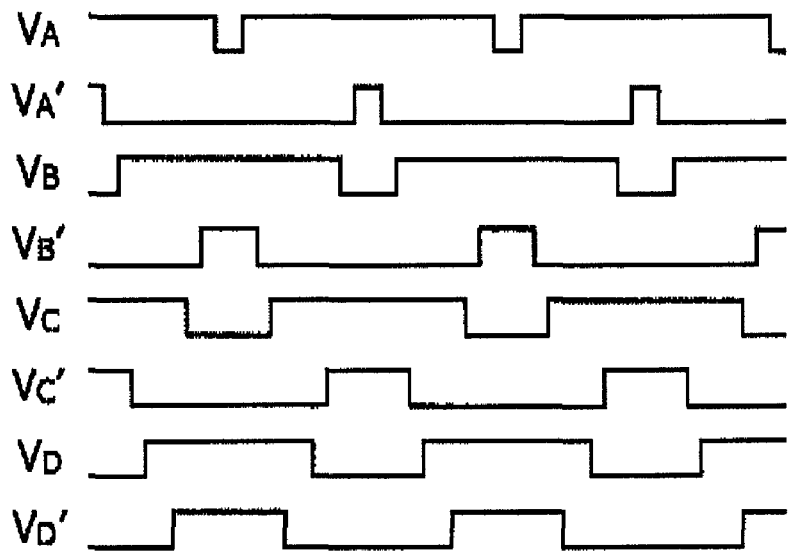
FIG.10(b) $V_A$ / $V_{A'}$
FIG.10(c) $V_B$ / $V_{B'}$
FIG.10(d) $V_C$ / $V_{C'}$
FIG.10(e) $V_D$ / $V_{D'}$
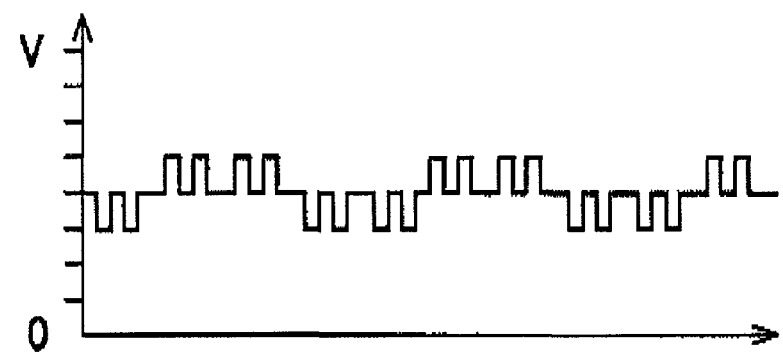
FIG.10(f)

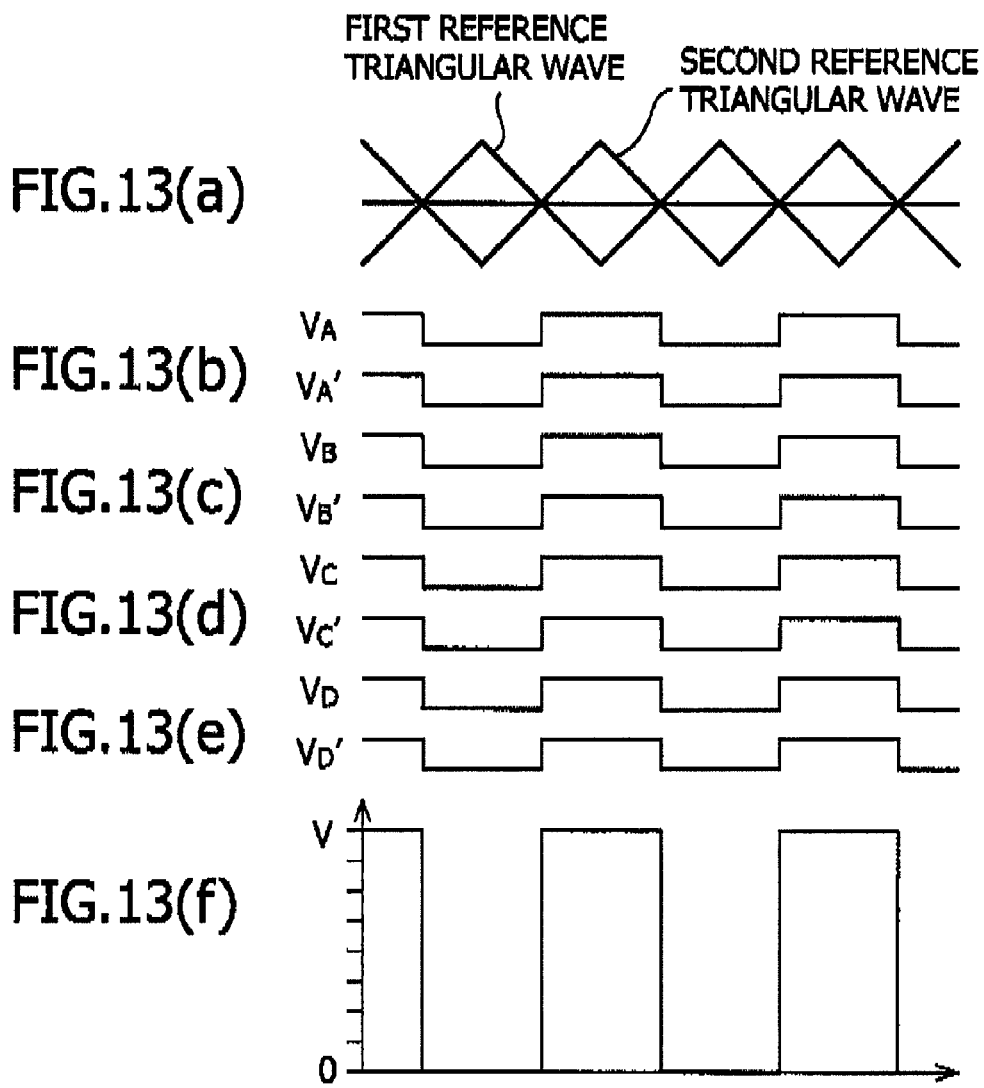
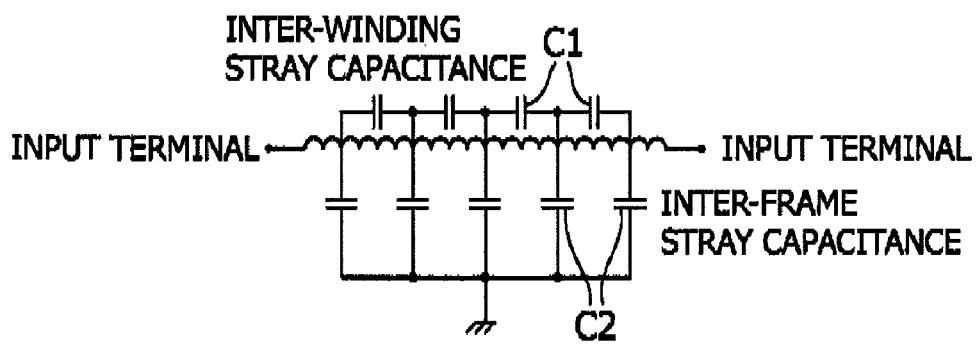
FIG. 14
(PRIOR ART)

FIG.17(a) (PRIOR ART)
FIG.17(b) (PRIOR ART)
FIG.17(c) (PRIOR ART)
FIG.17(d) (PRIOR ART)
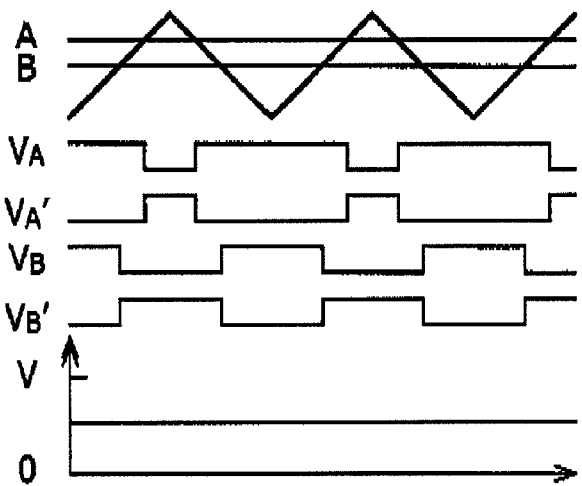
FIG.18(a) (PRIOR ART)  FIG.18(b) (PRIOR ART)
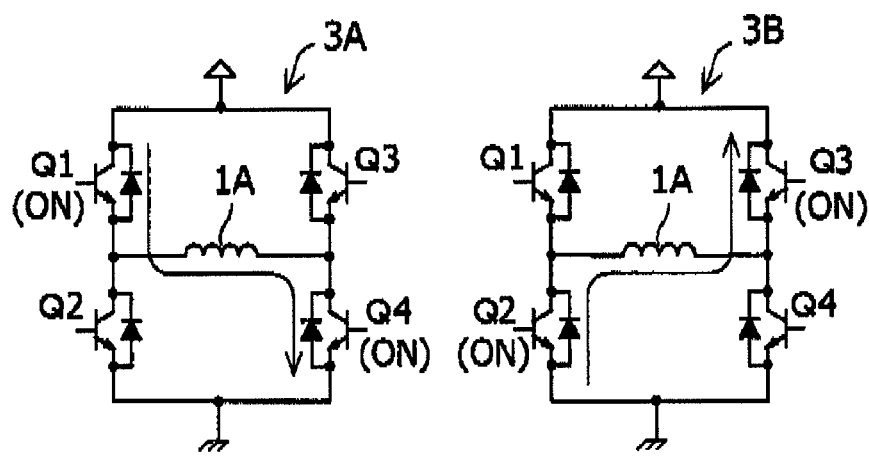
FIG.19 (PRIOR ART)
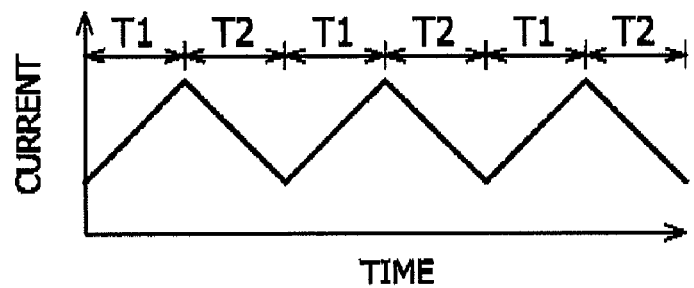

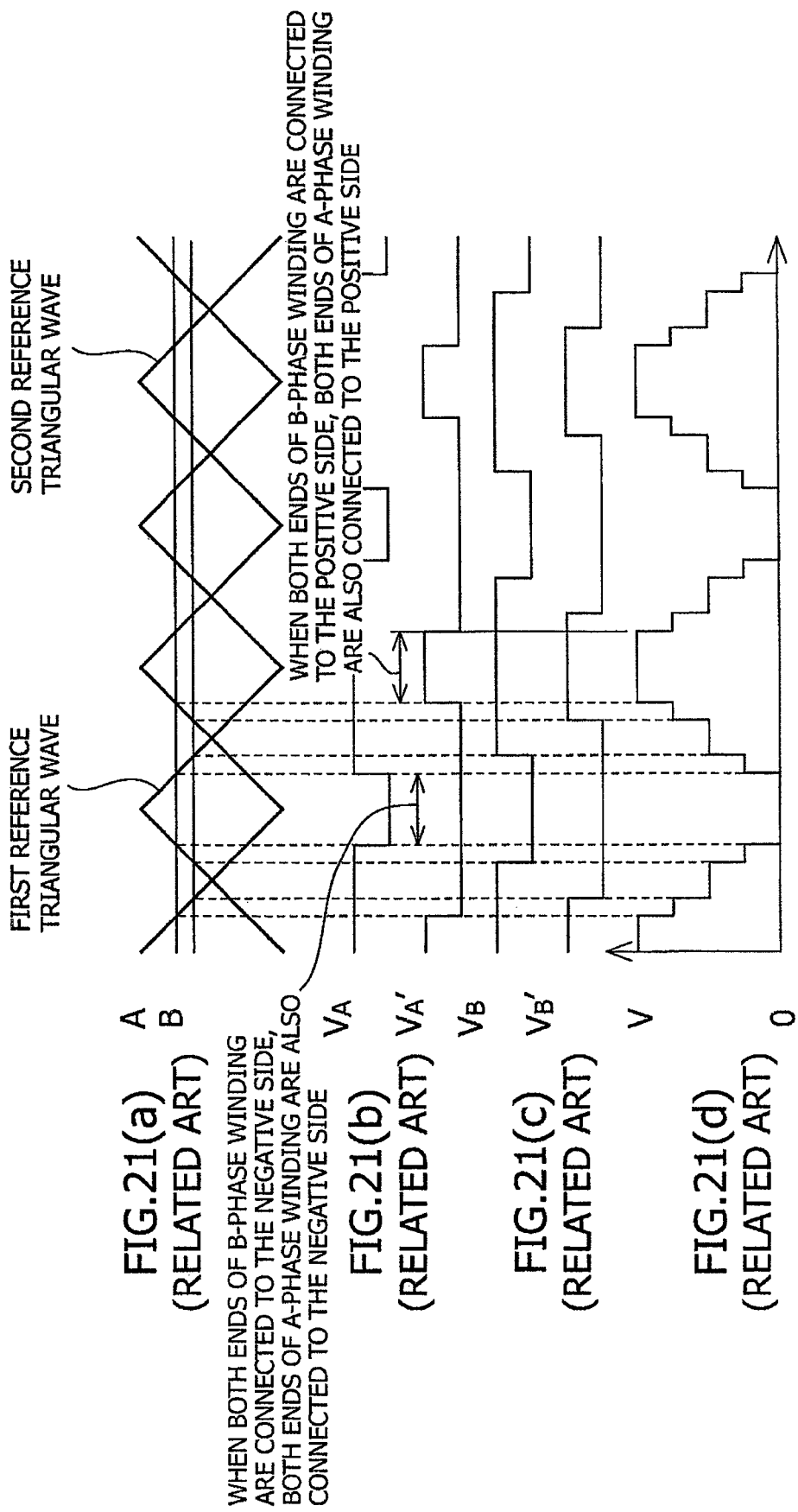

FIG. 23
(RELATED ART)
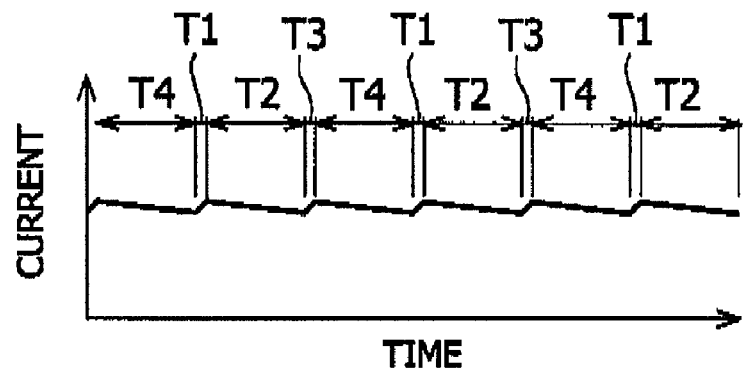
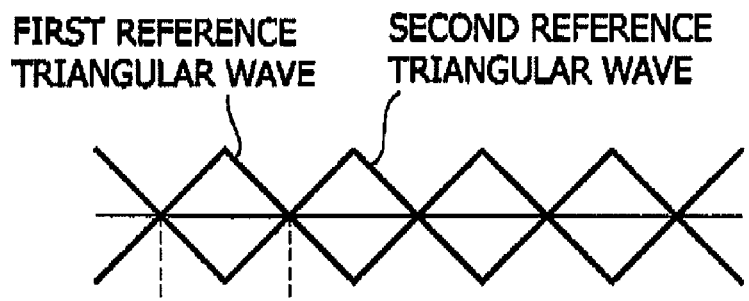
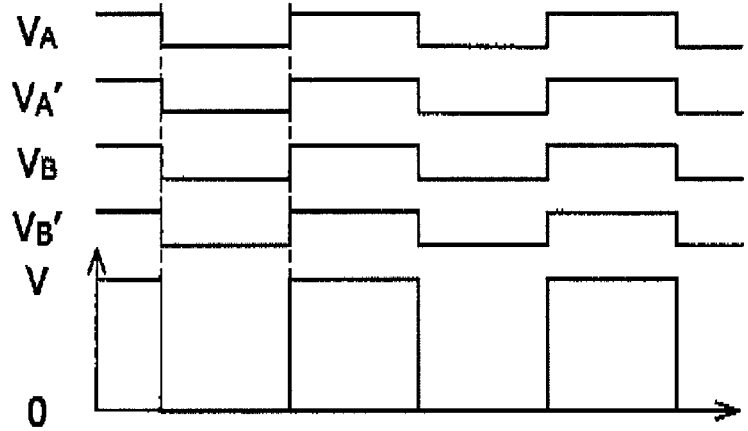

MOTOR CONTROL APPARATUS

FIELD OF THE INVENTION

The present invention relates to a motor control apparatus applied to a motor having a plurality of independent phase windings.

BACKGROUND OF THE INVENTION

Description of the Related Art

Many motor control apparatuses in recent years have a configuration which performs PWM (Pulse Width Modulation) control at a high frequency using a high-speed switching element such as a MOSFET (Metal-Oxide-Semiconductor Field-Effect Transistor) and IGBT (Insulated Gate Bipolar Transistor). In such a motor control apparatus, a drastic voltage variation of the switching element at the time of switching causes a phenomenon such that a "high frequency leakage current" flows into a grounding conductor through stray capacitance of the motor windings.

The above described high frequency leakage current becomes a source of electromagnetic interference. For the above described high frequency leakage current, a limit value thereof is defined by various safety standards from the standpoint of safety.

FIG. 14 is an equivalent circuit (shown as a distributed constant circuit) which shows a model of motor windings taking the above described stray capacitance into consideration. As shown in this FIG. 14, a high frequency current generated in the motor does not pass through winding inductance and flows into a grounding conductor through an inter-winding stray capacitance C1 interposed between the windings and an inter-frame stray capacitance C2 interposed between the windings and a motor frame (case). Therefore, when considered in terms of high frequency, it is possible to assume that the capacitances are concentrated on an input terminal.

FIG. 15 shows a high frequency equivalent circuit of a two-phase motor provided with an A-phase winding 1A and a B-phase winding 1B. A high frequency leakage current flows into the grounding conductor through a stray capacitance C3 shown in the same figure. To restrain this high frequency leakage current, a voltage variation of the motor frame must be suppressed.

As a conclusion, the voltage variation of the above described motor frame can be restrained by suppressing variations in the averages of the voltages of the respective terminals of the A-phase winding 1A and B-phase winding 1B. Therefore, a motor control apparatus substantively having the configuration illustrated in FIG. 16 is proposed (e.g., see Non-Patent Document 1).

This motor control apparatus is provided with an inverter type drive section 3A that drives an A-phase winding 1A, an inverter type drive section 3B that drives a B-phase winding 1B, a PWM control section 50A that controls ON/OFF of switching elements Q1 to Q4 of the drive section 3A, a PWM control section 50B that controls ON/OFF of switching elements Q5 to Q8 of the drive section 31B, a current detector 7A that detects a current of the A-phase winding 1A and a current detector 7B that detects a current of the B-phase winding 1B.

In the control section 50A, an amplifier 51 compares an A-phase current command with the current of the A-phase winding 1A detected by the current detector 7A, amplifies and outputs the deviation thereof. A comparator 52 compares the output of the amplifier 51 with a reference triangular wave, and thereby forms a signal for controlling ON/OFF of the switching elements Q1, Q4 of the drive section 3A. On the other hand an inverter 53 connected to the output of the comparator 52 forms a signal for controlling ON/OFF of switching elements Q2, Q3 of the drive section 3A. The control section 50B is provided with elements 51' to 53' which correspond to the above described elements 51 to 53.

The output of the above described amplifier 51 and the output of the amplifier 51' at a certain time point are expressed, for example, as shown by an upper line and a lower line in FIG. 17(a). In this case, a voltage $V_A$ at the left end and a voltage $V_A'$ at the right end of the A-phase winding 1A in FIG. 16 vary in the mode shown in FIG. 17(b) and a voltage $V_B$ at the left end and a voltage $V_B'$ at the right end of the B-phase winding 1B in FIG. 16 vary in a mode shown in FIG. 17(c).

According to the switching sequence in FIG. 17, as shown in FIG. 17(d), the average of each terminal voltage of the phase A winding 1A and B-phase winding 1B is always half a supply voltage V. In other words, the variation in the average of the above described terminal voltage is restrained.

In (a) and (b) in FIG. 18 each show a state in which a current is flowing through the A-phase winding 1A from left to right. In (a) of the same figure, a current flows through the switching elements Q1, Q4 and in (b) of the same figure, a current (free wheel current) flows through free wheel diodes connected in parallel to the switching elements Q2, Q3. FIG. 19 shows the waveform of each of the above described currents. T1, T2 shown in this FIG. 19 denote conducting periods of the A-phase winding 1A in FIGS. 18(a), (b) respectively.

According to the above described switching sequence, the averages of the respective terminal voltages of the A-phase winding 1A and B-phase winding 1B are restrained, but as shown in FIGS. 17(b), (c), the supply voltage V is always applied to both windings 1A and 1B. Therefore, every time the polarity of the voltage applied to the windings 1A, 1B change, the currents flowing through the windings 1A, 1B drastically fluctuate at a change rate expressed by di/dt=V/L (L denotes inductance of windings 1A, 1B) (see FIG. 19). In this way, when the winding current drastically fluctuates, both a copper loss due to resistances of the windings 1A, 1B and an iron loss generated in the iron plate increase.

To suppress the fluctuation of the above described winding current, it is possible to consider providing a mode in which both ends of the winding 1A (winding 1B) are connected to the same potential in the switching sequence so as to cause the winding current to recycle.

FIG. 20 shows a two-phase motor control apparatus configured to realize the mode in which the winding current is recycled. In this FIG. 20, a control section 500A differs from the control section 50A shown in FIG. 16 in that a comparator 54 and an inverter 55 are added and in the same way, a control section 500B differs from the control section 50B shown in the same figure in that a comparator 54' and an inverter 55' are added.

One comparator 52 in the control section 500A compares the output of an amplifier 51 with a first reference triangular wave and thereby forms a signal for controlling ON/OFF of a switching element Q1 and on the other hand, an inverter 53 connected to the output of the comparator 52 forms a signal for controlling ON/OFF of a switching element Q2.

The other comparator 54 of the control section 500A compares the output of the amplifier 51 with a second reference triangular wave having a phase difference of 180 degrees from the above described first reference triangular wave and thereby generates a signal for controlling ON/OFF of a switching element Q4.

Furthermore, the inverter 55 connected to the output of this comparator 54 forms a signal for controlling ON/OFF of a switching element Q3.

On the other hand, comparators 52', 54' and inverters 53', 55' in the control section 500B perform operations pursuant to the comparators 52, 54 and the inverter 53 of the control section 500A and form signals for controlling ON/OFF of switching elements Q5 to Q8.

The output of the amplifier 51 and the output of an amplifier 51' with respect to the above described first and second reference triangular waves at a certain time point are expressed as the upper line and lower line in FIG. 21(*a*) respectively. In this case, a voltage $V_A$ at the left end and a voltage $V_A'$ at the right end of an A-phase winding 1A in FIG. 20 vary in the mode shown in FIG. 21(*b*) and a voltage $V_B$ at the left end and a voltage $V_B'$ at the right end of a B-phase winding 1B in FIG. 20 vary in the mode shown in FIG. 21(*c*).

According to the switching sequence shown in FIG. 21, the averages of the respective terminal voltages of the A-phase winding 1A and B-phase winding 1B fluctuate in the mode shown in (d) of the same figure. That is, the averages vary in steps of V/4 every time the switching condition changes within a range of 0 to V (V is a supply voltage).

FIGS. 22(*a*) to (*d*) show a state in which a current flows through the A-phase winding 1A from left to right. In (a) of the same figure, a current flows through the switching elements Q1, Q4 and in (b) of the same figure, a current flows through a free wheel diode and the switching element Q4 connected in parallel to the switching element Q2. Furthermore, in (c) of the same figure, the above described current flows through the switching elements Q1, Q4, furthermore, in (d) of the same figure, the above described current flows through the switching element Q1 and a free wheel diode connected in parallel to the switching element Q3. FIG. 23 shows the waveforms of the above described respective currents. T1 to T4 shown in this FIG. 23 denote conducting periods in FIGS. 22(*a*) to (*d*) respectively.

Since a supply voltage V is applied to the A-phase winding 1A in the conditions of FIGS. 22(*a*), (*c*), the current which flows through this A-phase winding 1A changes at a change rate expressed by $di/dt=V/L$. On the other hand, since both ends of the A-phase winding 1A have the same potential in the states of FIGS. 22(*b*), (*d*), the current of this winding 1A gently decreases due to the resistance of the winding 1A and the internal resistance of the free wheel diode.

FIG. 24 shows a switching sequence when the current is controlled to 0 (see (a) of the same figure). In this switching sequence, as is clear from (b) and (c) of the same figure, a state in which both ends of the A-phase winding 1A and the B-phase winding 1B are connected to the positive side of the power supply and a state in which they are connected to the GND side are repeated at a duty of 50%.

Since the voltages applied to the A-phase winding 1A and the B-phase winding 1B are 0 in this state, no current flows through these windings 1A, 1B. However, in this state, the magnitude of variations in the averages of the respective terminal voltages of the A-phase winding 1A and the B-phase winding 1B becomes the supply voltage V as shown in FIG. 24(*d*), and therefore the voltage variation of the motor frame becomes a maximum.

(Patent Document 1] "STEP MOTOR SYSTEM DESIGN HANDBOOK" Second Edition Albert C. Leenhouts Published by Litchfield Engineering Co., Kingman Ariz. U.S.A. 1997.)

As described above, according to the motor control apparatus shown in FIG. 20, while the variation (ripple) in the current flowing through the motor is reduced, variations in the averages of the respective terminal voltages of the A-phase winding 1A and the B-phase winding 1B increase, and therefore the variation in the motor frame voltage increases, in other words, there is a possibility that a high frequency leakage current may increase, producing electromagnetic interference.

The present invention has been implemented in view of the above described problems and it is an object of the present invention to provide a motor control apparatus capable of effectively suppressing a high frequency leakage current while reducing ripples of a current flowing through the motor.

SUMMARY OF THE INVENTION

In order to attain the above described object, one embodiment of the present invention is a motor control apparatus applied to a motor having a plurality of independent phase windings for controlling the plurality of phase windings by dividing the phase windings into one set of windings and another set of windings, including a plurality of inverter type drive means for driving the respective phase windings and a plurality of PWM control means for PWM-controlling the respective inverter type drive means, wherein each of the PWM control means is configured so as to execute a switching sequence in which the corresponding inverter type drive means can assume a condition of applying a voltage of a power supply to both ends of the phase winding according to the drive means, a condition of connecting both ends of the phase winding to the positive side of the power supply and a condition of connecting both ends of the winding to the negative side of the power supply, further the PWM control means corresponding to the drive means according to the one set of phase windings and the PWM control means corresponding to the drive means according to the other set of phase windings set a mutual phase relationship of switching sequence so as to connect at least one end of all phase windings included in the other set to the negative side of the power supply when both ends of at least one phase winding included in the one set are connected to the positive side of the power supply and connect at least one end of all the phase windings included in the other set to the positive side of the power supply when both ends of at least one phase winding included in the one set are connected to the negative side of the power supply.

The respective inverter type drive means can be provided with a first and second switching elements interposed between one end of a corresponding phase winding and a positive electrode and a negative electrode of the power supply and a third and fourth switching elements interposed between the other, end of the phase winding and the positive electrode and the negative electrode of the power supply.

Of the respective PWM control means, the PWM control means corresponding to the inverter type drive means that drives the one set of phase windings is configured so as to control the first and second switching elements based on a comparison between a deviation of the current value of the phase winding corresponding to a current command and a first reference triangular wave and control the third and fourth switching elements based on a comparison between the deviation of the current value of the phase winding and a second reference triangular wave having a phase shift of 180 degrees from the first reference triangular wave, and of the respective PWM control means, the PWM control means corresponding to the inverter type drive means that drives the other set of phase windings is configured so as to control the first and second switching elements based on a comparison between the deviation of the current value of the phase winding corresponding to the current command and the second reference triangular wave and control the third and fourth switching elements based on a comparison between the deviation of the current value of the phase winding and the first reference triangular wave.

The present invention can be applied to a motor provided with two or three or more of the above described phase windings.

According to the present invention, ripples of a current which flows through the motor are reduced. Furthermore, since a variation in a common mode voltage is reduced, a high frequency leakage current caused by the variation in the frame voltage of the motor can be substantially suppressed without using parts such as a common mode coil. Therefore, it is possible to realize control of the motor with EMI (electromagnetic interference) restrained or prevented.

BRIEF DESCRIPTION OF THE DRAWINGS

FIG. 5 is a chart showing an example of the switching sequence of the motor control apparatus in FIG. 4;

FIG. 8 is a chart showing a switching sequence of the motor control apparatus of the comparative example when a current is controlled to 0;

FIG. 10 is a chart showing an example of the switching sequence of the motor control apparatus in FIG. 9;

FIG. 13 is a chart showing the switching sequence of the motor control apparatus of the comparative example when a current is controlled to 0;

FIG. 14 is an equivalent circuit diagram of windings with stray capacitance taken into consideration;

FIG. 17 is a chart showing a switching sequence of the motor control apparatus in FIG. 16;

FIG. 18 is a circuit diagram illustrating a current path about the A-phase winding of the motor control apparatus in FIG. 16;

FIG. 19 is a waveform diagram of each current shown in FIG. 18;

FIG. 21 is a chart showing a switching sequence of the motor control apparatus in FIG. 20;

FIG. 23 is a waveform diagram of each current shown in FIG. 22; and

FIG. 24 is a chart showing the switching sequence of the motor control apparatus in FIG. 20 when a current is controlled to 0.

DETAILED DESCRIPTION OF THE PREFERRED EMBODIMENTS

Figure 1:
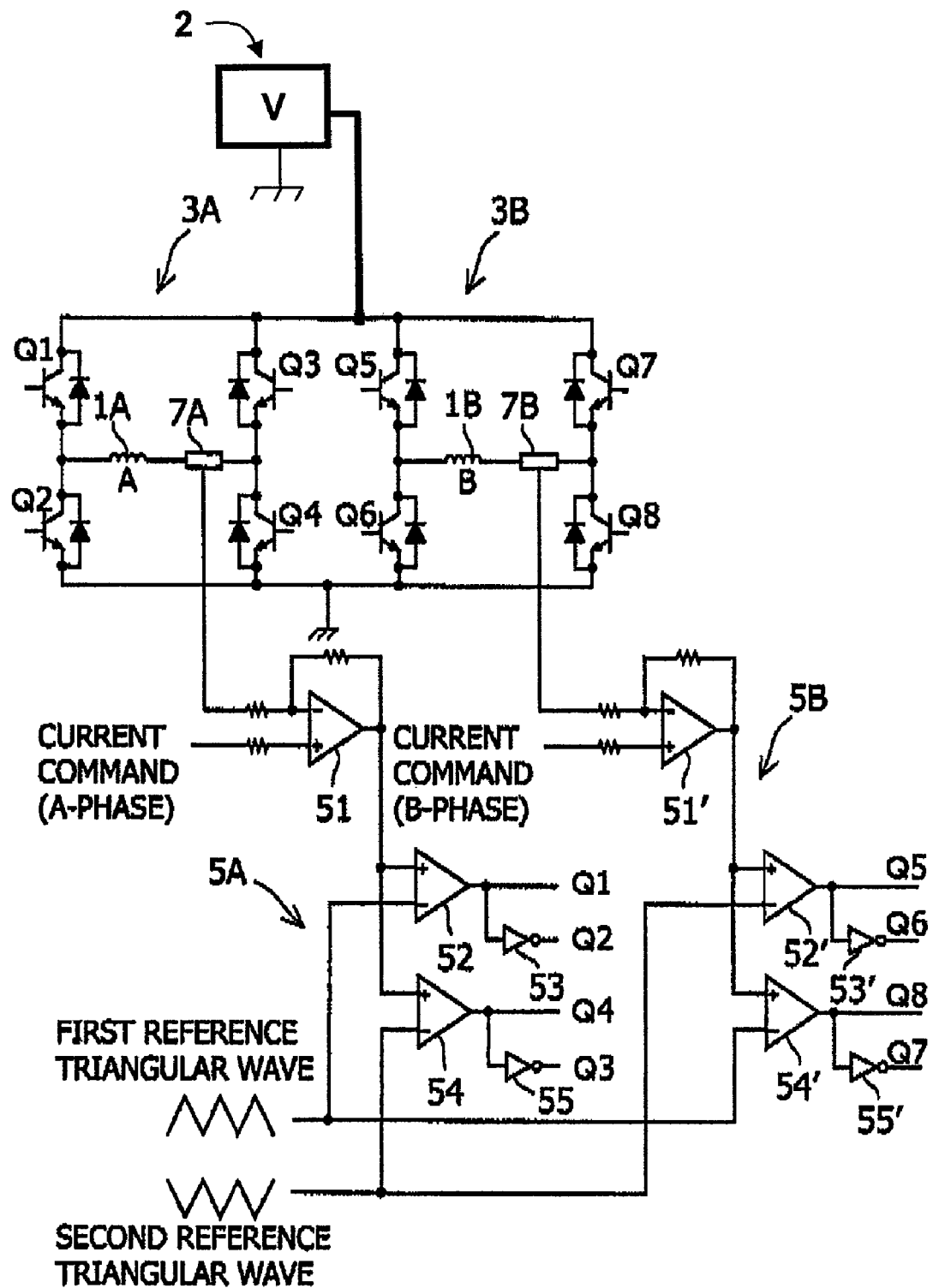
FIG. 1 is a circuit diagram showing an embodiment of a motor control apparatus according to the present invention applied to a two-phase motor.

FIG. 1 is a circuit diagram showing an embodiment of a motor control apparatus according to the present invention applied to a two-phase motor (e.g., two-phase stepper motor) that is connected to the output of a power supply 2. The power supply output has a positive side also called a positive electrode) providing an output voltage and a negative side (negative electrode), which is grounded. This FIG. 1 shows elements identical or common to elements in FIG. 20 assigned the same reference numerals.

Figure 20:
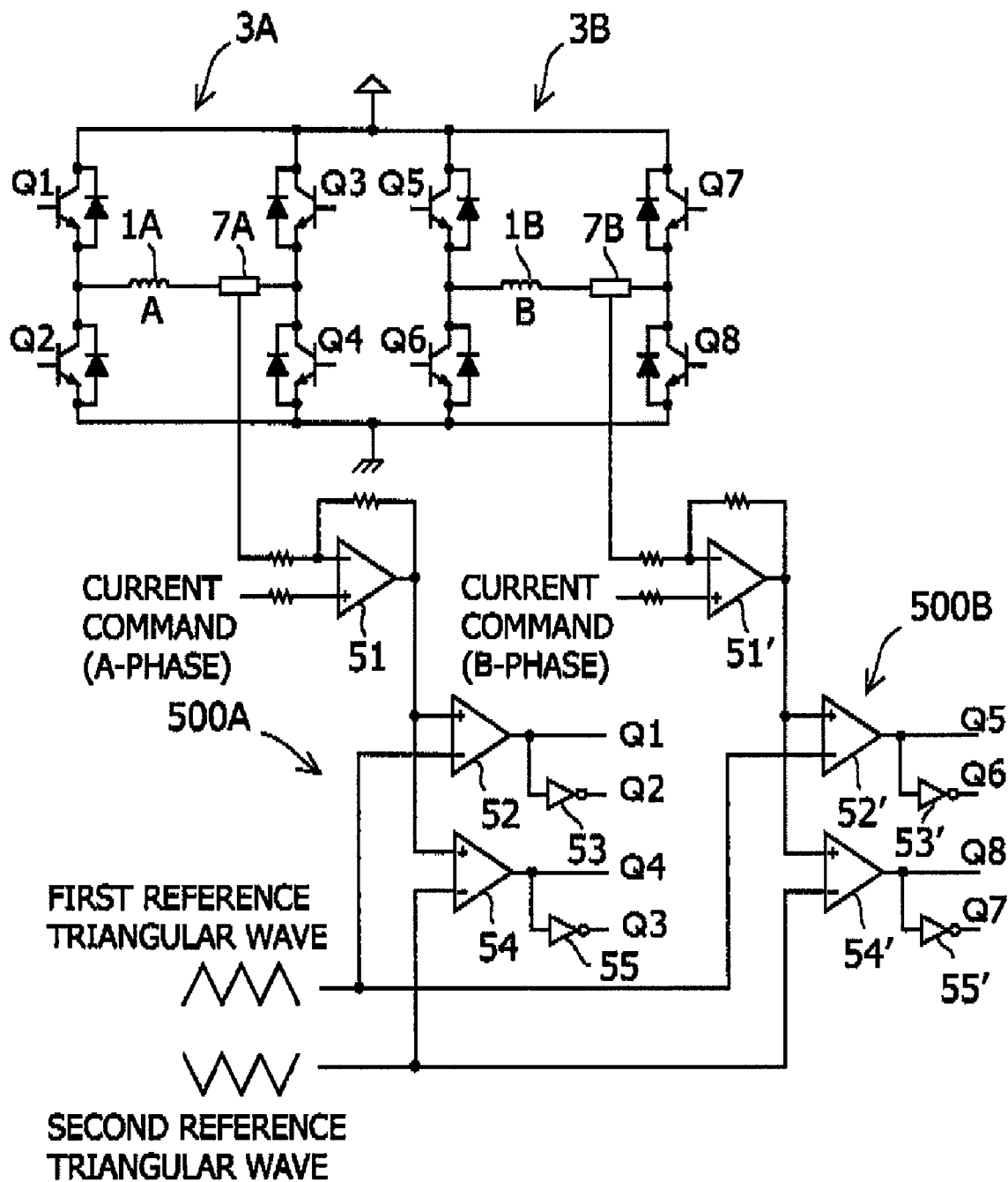
FIG. 20 is a circuit diagram showing an example of a two-phase motor control apparatus according to a comparative example.
Figure 22A:
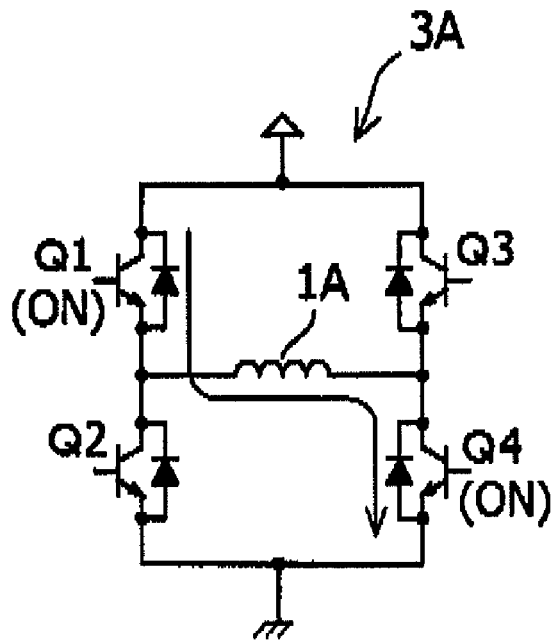
FIG. 22 is a circuit diagram illustrating a current path about the A-phase winding of the motor control apparatus in FIG. 20.
Figure 22B:
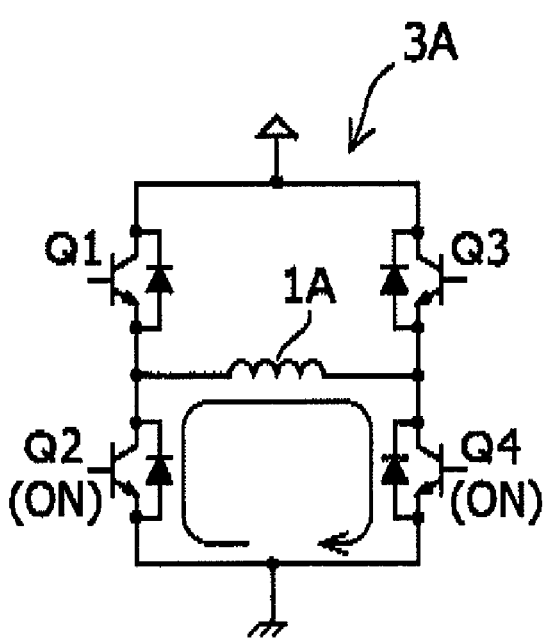
Figure 22C:
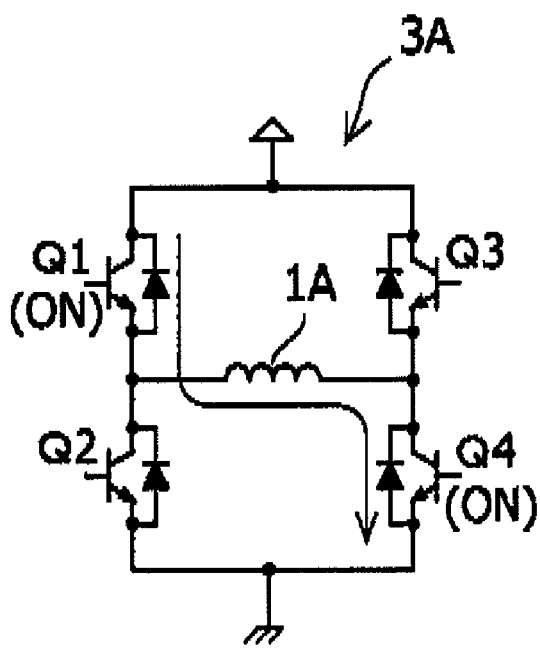
Figure 22D:
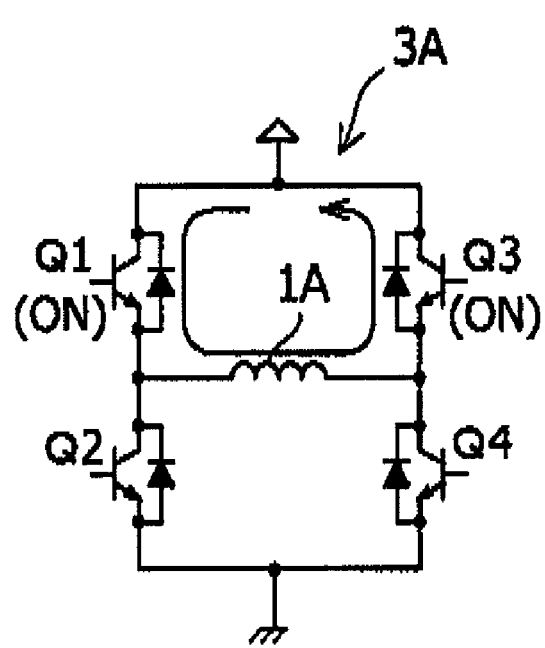

The motor control apparatus according to this embodiment is provided with drive sections 3A, 3B and current detectors 7A, 7B like the control apparatus which is shown in FIG. 20. A control section 5A has the same configuration as that of the control section 500A shown in FIG. 20. On the other hand, a control section 5B differs from the control section 500B shown in FIG. 20 in the type of reference triangular waves inputted to comparators 52', 54'.

That is, control section 500B shown in FIG. 20 is configured so as to input a first reference triangular wave to comparator 52' and input a second reference triangular wave having a phase shift of 180 degrees from the first reference triangular wave to the comparator 54' respectively. On the contrary, the control section 5B is configured so as to input a second reference triangular wave to the comparator 52' and input a first reference triangular wave to the comparator 54'.

Next, the operation of the motor control apparatus according to this embodiment in the above described configuration will be explained.

The outputs of the above described amplifiers 51 and 51' at some time point are expressed respectively as the upper line and lower line in FIG. 2(a), for example. In this case, a voltage $V_A$ at the left end and a voltage $V_{A'}$ at the right end of an A-phase winding 1A in FIG. 1 vary respectively in the form shown in FIG. 2(b) (the same as the form shown in FIG. 21(b)). On the other hand, a voltage $V_B$ at the left end of a B-phase winding 1B in FIG. 1 and the voltage $V_{B'}$ at the right end vary in the form shown in FIG. 2(c) (the form in which the phases of the voltage $V_B$ and $V_{B'}$ shown in FIG. 21(c) are shifted by 180°.

Figure 2:
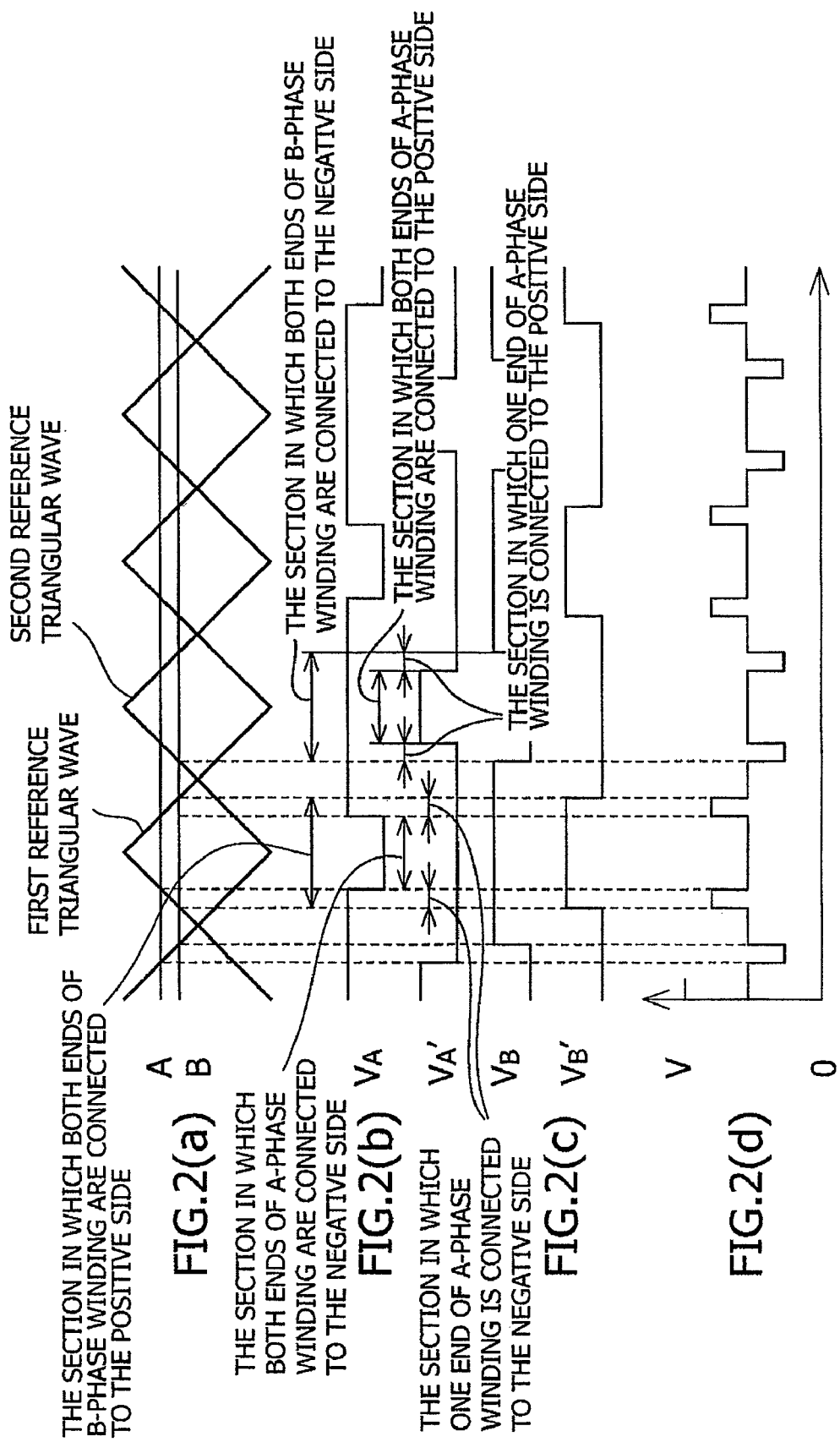
FIG. 2 is a chart showing an example of a switching sequence of the motor control apparatus in FIG. 1.

In the case of the switching sequence in this FIG. 2, though the current paths and current waveforms of the individual phase windings 1A, 1B are not different from those in the case of the switching sequence in FIG. 21 (see FIG. 22 and FIG. 23), variations in the averages of the respective terminal voltages of the phase windings 1A, 1B are drastically suppressed as shown in FIG. 2(d).

That is, in the switching sequence in FIG. 21, the averages of the respective terminal voltages of the phase windings 1A, 1B vary within a range of 0 to V (see FIG. 21(d)), whereas in the switching sequence in FIG. 2, the above described averages vary within a range of V/4 to 3V/4 as shown in (d) of the same figure. In other words, the variation width of the above average is restrained by half compared with the case of the switching sequence in FIG. 21.

Furthermore, in the switching sequence in FIG. 2, since the time during which the variation width of the above described average goes out of V/2 is shortened, the above described average is stabilized to V/2 for most of the time. That is, when, for example, the motor is run at a low speed or stopped, the current can be passed through the windings 1A, 1B even if the duration that voltages are applied to the windings 1A, 1B is short, the averages of the respective terminal voltages of the phase windings 1A, 1B vary to V/4 or 3V/4 instantaneously, but the above described averages are stabilized to V/2 for most of the time.

Figure 3:
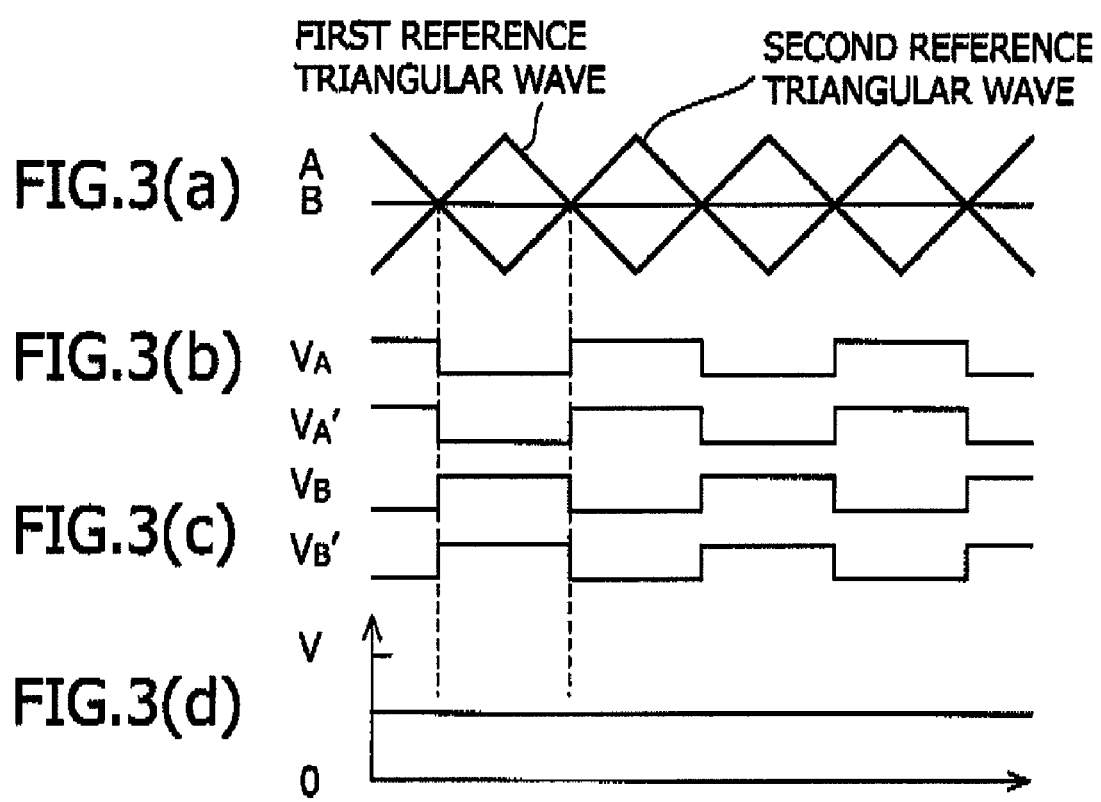
FIG. 3 is a chart showing a switching sequence of the motor control apparatus in FIG. 1 when a current is controlled to 0.

FIG. 3 shows the switching sequence when a current is controlled to 0 (when the outputs of the amplifiers 51, 51' are 0) as shown in (a) of the same figure. In this switching sequence, as is clear from (b), (c) of the same figure, a state in which both ends of the A-phase winding 1A and B-phase winding 1B are connected to the positive side of the power supply and a state in which they are connected to the GND side are repeated at a rate of duty 50%. Therefore, no current flows through the phase windings 1A, 1B.

As a result, in this switching sequence, the averages of the respective terminal voltages of the respective phase windings 1A, 1B become constant (V/2) and do not change as shown in (d) of the same figure.

According to the above described embodiment, ripples of the current which flows through the motor can be reduced and moreover variations in the frame voltage of the motor can be restrained without adding parts such as a common mode coil. Therefore, EMI (electromagnetic interference) can be restrained by substantially reducing a high frequency leakage current while restraining copper loss and iron loss produced in an iron plate as much as possible.

Figure 4:
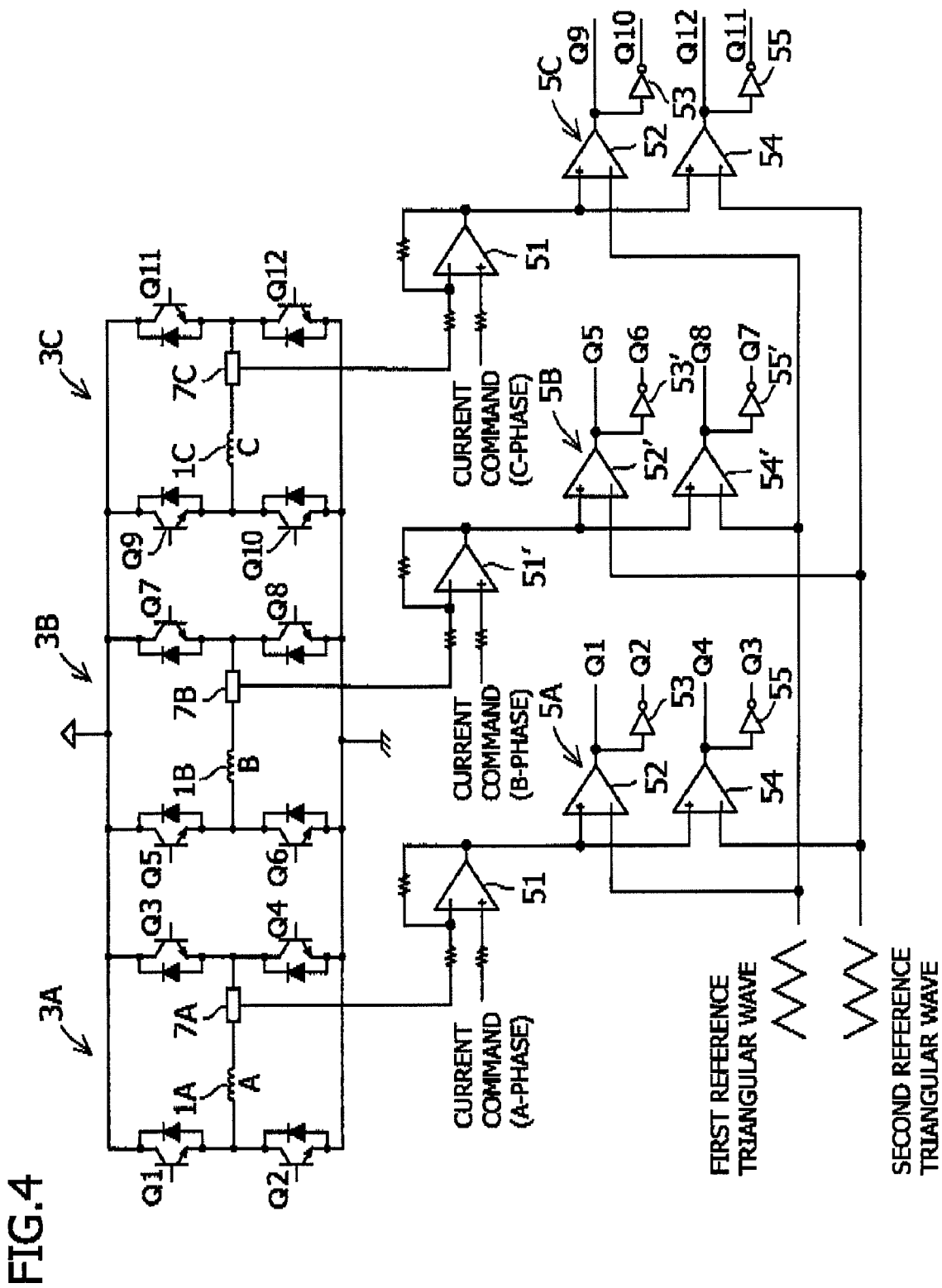
FIG. 4 is a circuit diagram showing an embodiment of the motor control apparatus according to the present invention applied to a three-phase motor.
Figure 9:
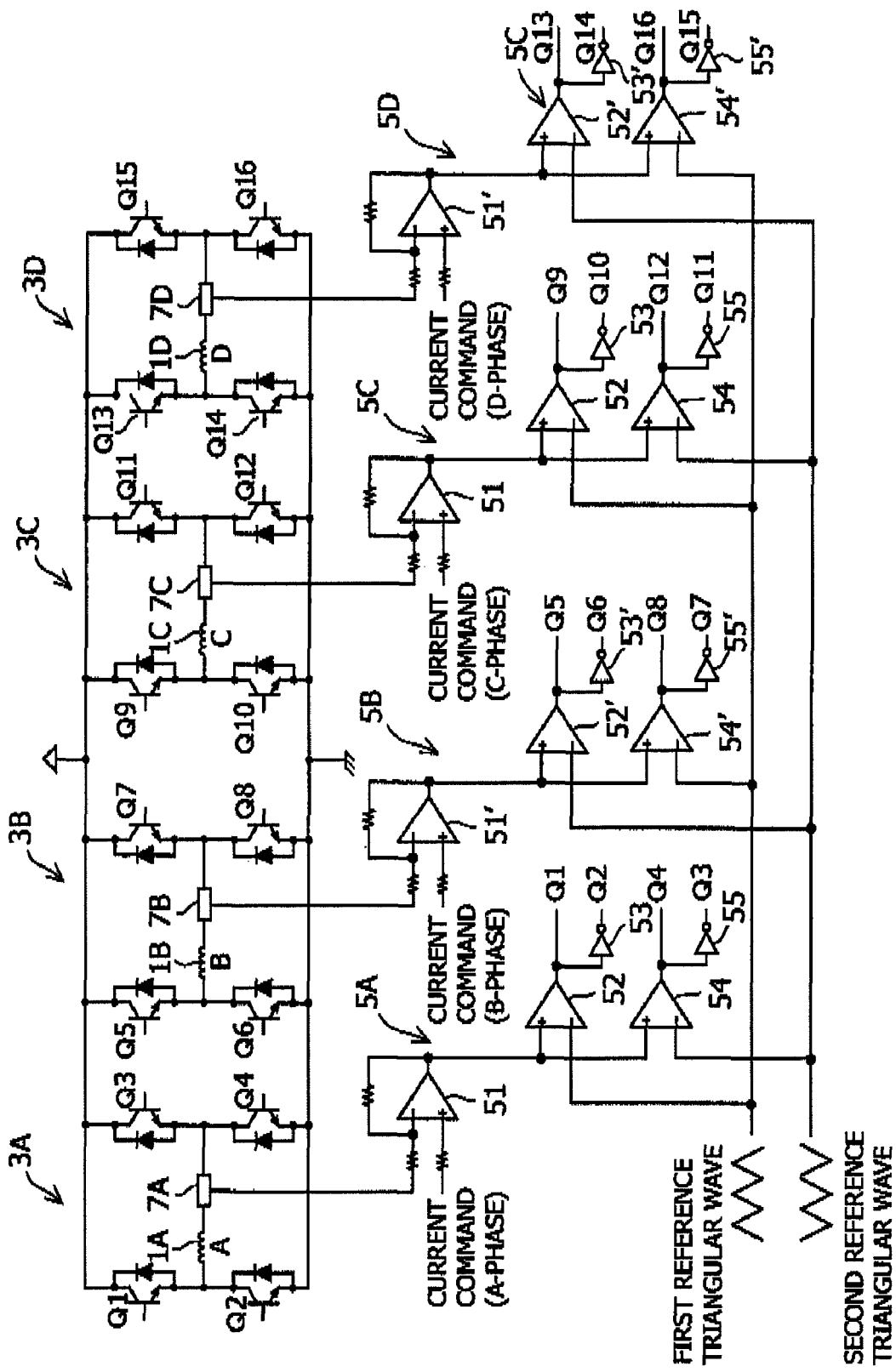
FIG. 9 is a circuit diagram showing an embodiment of the motor control apparatus according to the present invention applied to a four-phase motor.

The present invention can be effectively applied not only to a two-phase motor but also to a multiphase (three-phase, four-phase, five-phase, six-phase or the like) motor which has three or more independent phase windings. FIG. 4 and FIG. 9 show embodiments of the motor control apparatus according to the present invention when applied to a three-phase motor and four-phase motor, respectively.

The motor control apparatus shown in FIG. 4 has the configuration with a drive section 3C made up of switching elements Q9 to Q12, a current detector 7C that detects a current of a C phase winding 1C and a control section 5C that PWM-controls the drive section 3C added to the control apparatus in FIG. 1. The control section 5C has the configuration which corresponds to the control section 5A in FIG. 1 and forms an ON/OFF control signal to the switching elements Q9 to Q12 based on the output of the current detector 7C and first and second reference triangular waves.

When the respective outputs of an A-phase amplifier 51, B-phase amplifier 51' and C phase amplifier 51 corresponding to the above described first and second reference triangular waves have values shown, for example, by the upper, middle and lower lines in FIG. 5(a) respectively, a voltage $V_A$ at the left end and a voltage $V_A'$ at the right end of the A-phase winding 1A vary in the mode shown in (b) of the same figure, a voltage $V_B$ at the left end and a voltage $V_B'$ at the right end of the B-phase winding 1B vary in the mode shown in (c) of the same figure and a voltage $V_C$ at the left end and a voltage $V_C'$ at the right end of the C phase winding 1C vary in the mode shown in (c) of the same figure. As a result, the averages of the respective terminal voltages of the A-phase winding 1A, B-phase winding 1B and C phase winding 1C change in the mode shown in (e) of the same figure, that is, within a range of 2V/6(V/3) to 4V/6(2V/3).

Figure 6A:
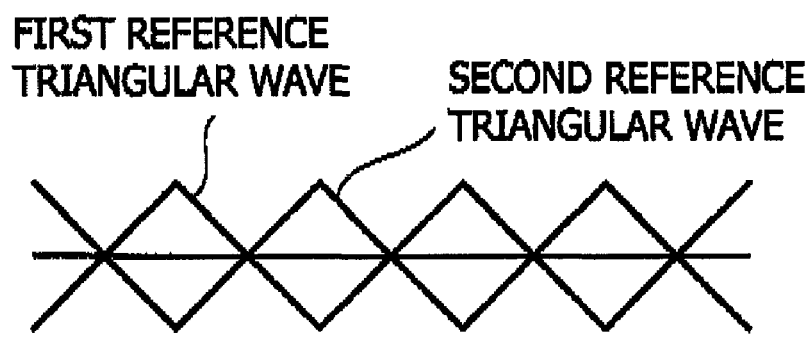
FIG. 6 is a chart showing the switching sequence of the motor control apparatus in FIG. 4 when a current is controlled to 0.
Figures 6B, 6C, 6D:
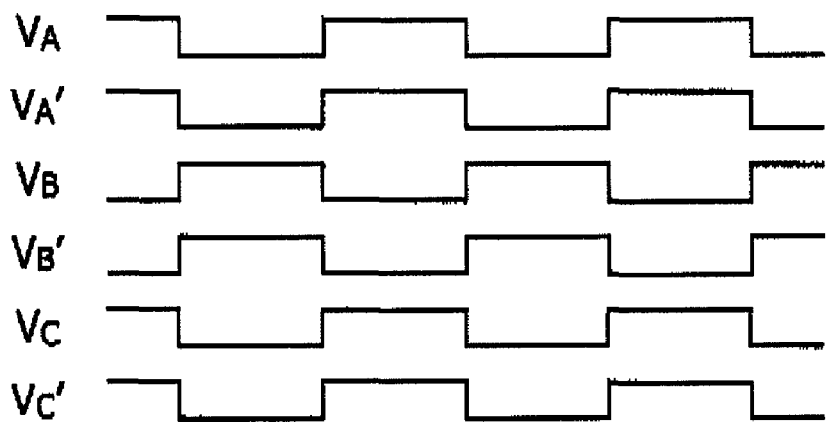

FIG. 6 shows a switching sequence when a current is controlled to 0. In this switching sequence, no current flows through the respective phase windings 1A, 1B and 1C and also the averages of the respective terminal voltages of the respective phase windings 1A, 1B and 1C change within a range of 2V/6(V/3) to 4V/6(2V/3).

Figure 6E:
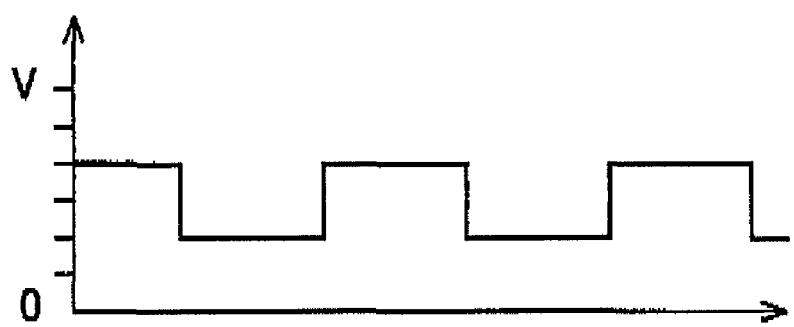
Figure 7A:
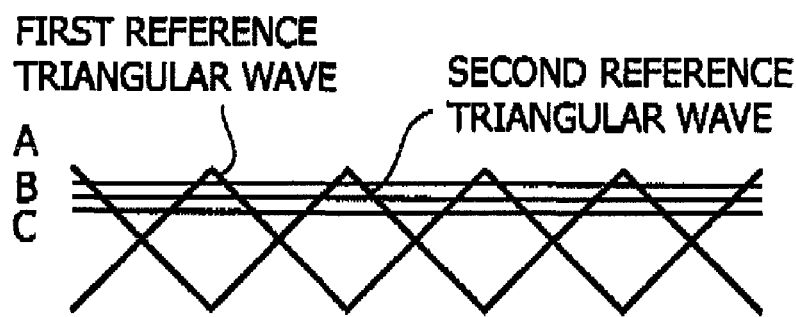
FIG. 7 is a chart showing an example of a switching sequence of a motor control apparatus of a comparative example.
Figure 7C:
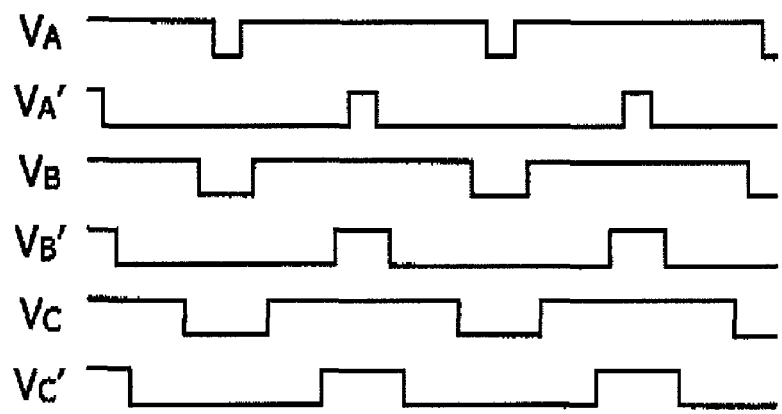
Figure 7E:
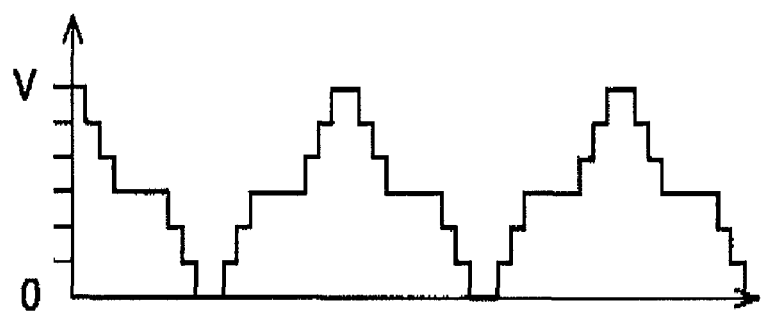

FIG. 7 and FIG. 8 show switching sequences corresponding to FIG. 5 and FIG. 6 respectively when the above described three-phase motor is controlled by a three-phase motor control apparatus pursuant to the configuration of the control apparatus in FIG. 20. As is clear from the contrast between FIG. 5(e) and FIG. 7(e) and the contrast between FIG. 6(e) and FIG. 8(e), according to the control apparatus of the present invention shown in FIG. 4, variations in the averages of the terminal voltages of the respective phase windings are restrained and the time during which the variation width of the above described average goes out of V/2 is shortened.

The four-phase motor control apparatus shown in FIG. 9 has a configuration with a drive section 3D made up of switching elements Q13 to Q16, a current detector 7D that detects a current of a D phase winding 1D and a control section 5D that PWM-controls the drive section 3D added to the control apparatus in FIG. 4. The control section 5D has the configuration which corresponds to the control section 5B in FIG. 4 and forms an ON/OFF control signal to switching elements Q13 to Q16 based on the output of the current detector 7D and the first and second reference triangular waves.

When the respective outputs of an A-phase amplifier 51, B-phase amplifier 51', C-phase amplifier 51 and D-phase amplifier 51' corresponding to the above described first and second reference triangular waves are expressed, for example, by lines sequentially arranged from top to bottom in FIG. 10(a), a voltage $V_A$ at the left end and a voltage $V_A'$ at the right end of the A-phase winding 1A vary in the mode shown in (b) of the same figure, a voltage $V_B$ at the left end and a voltage $V_B'$ at the right end of the B-phase winding 1B vary in the mode shown in (c) of the same figure, a voltage $V_C$ at the left end and a voltage $V_C'$ at the right end of the C phase winding 1C vary in the mode shown in (d) of the same figure and a voltage $V_D$ at the left end and a voltage $V_D'$ at the right end of the D phase winding 1D vary in the mode shown in (e) of the same figure. As a result, the averages of the respective terminal voltages of the winding 1A, winding 1B, winding 1C and winding 1D change in the form shown in (f) of the same figure, that is, change within a range of 3V/8 to 5V/8.

Figure 11A:
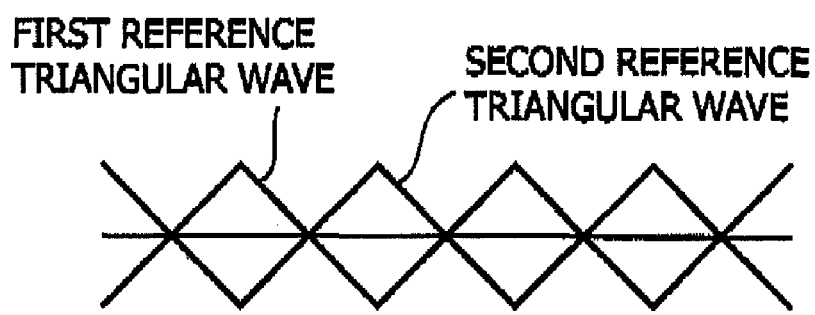
FIG. 11 is a chart showing the switching sequence of the motor control apparatus in FIG. 9 when a current is controlled to 0.
Figures 11B, 11C, 11D, 11E:
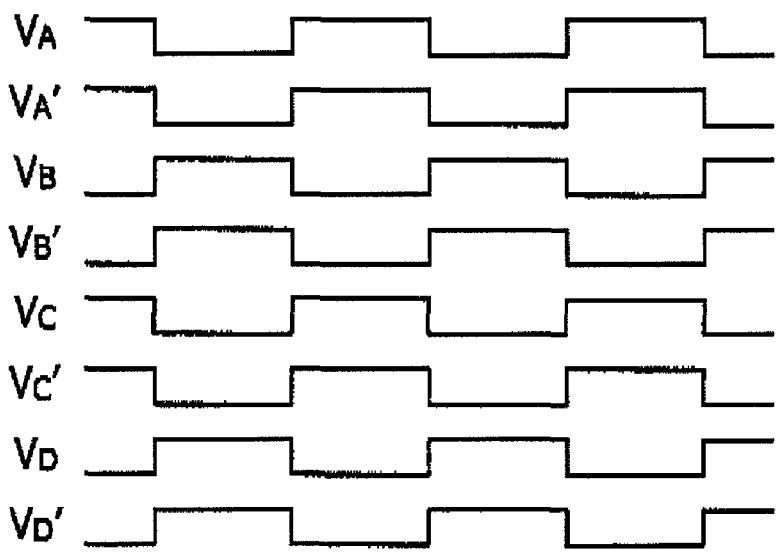

FIG. 11 is a switching sequence when a current is controlled to 0. In this switching sequence, no current flows through the respective phase windings 1A, 1B, 1C and 1D and also averages of the respective terminal voltages of the respective phase windings 1A, 1B, 1C and 1D are fixed to V/2.

Figure 11F:
Figure 12A:
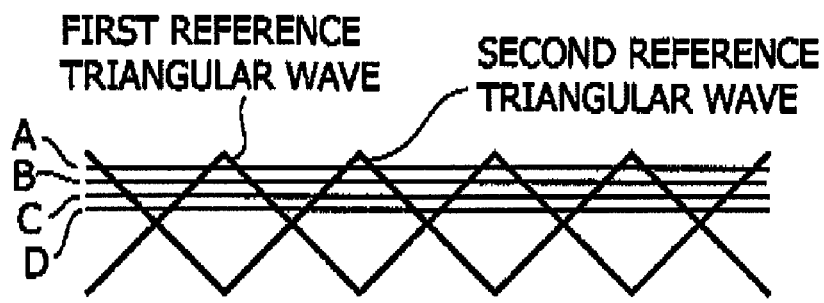
FIG. 12 is a chart showing an example of a switching sequence of a motor control apparatus of a comparative example.
Figure 12B:
Figure 12C:
Figure 12D:
Figure 12E:
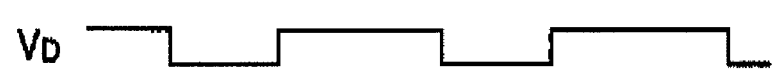
Figure 12F:
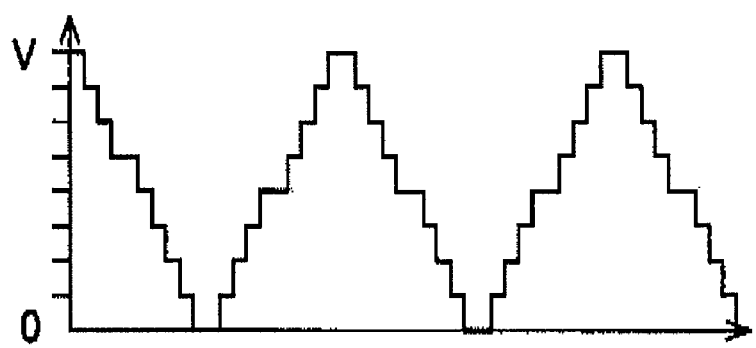
Figure 15:
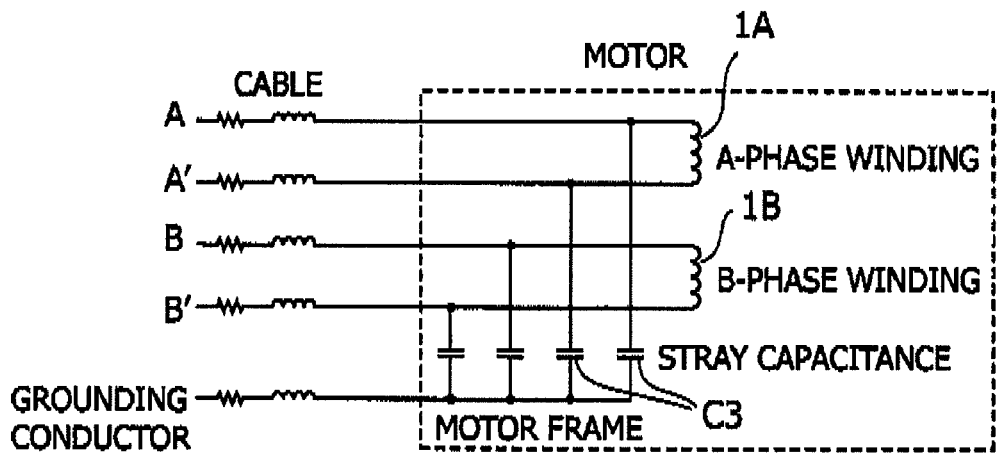
FIG. 15 is a high frequency equivalent circuit diagram of a two-phase motor.
Figure 16:
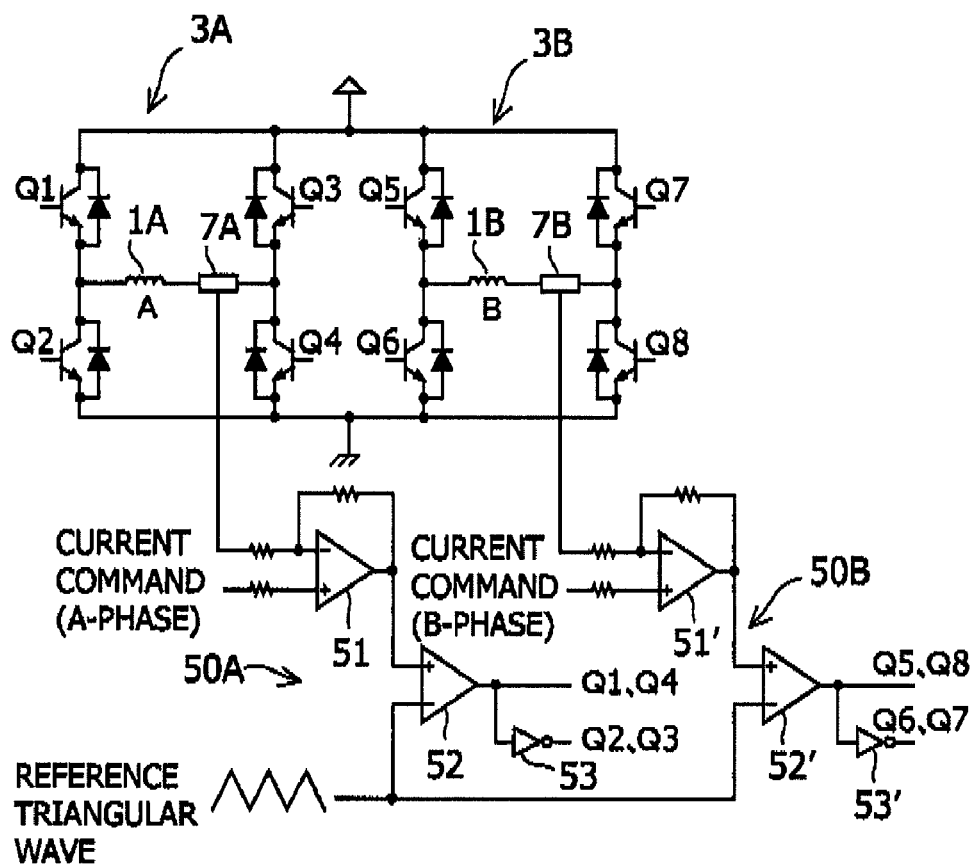
FIG. 16 is a circuit diagram showing an example of a conventional motor control apparatus.

FIG. 12 and FIG. 13 show switching sequences which correspond to FIG. 10 and FIG. 11 respectively when the above described four-phase motor is controlled by a four-phase motor control apparatus pursuant to the configuration of the control apparatus in FIG. 20. As is clear from the contrast between FIG. 10(f) and FIG. 12(f) and the contrast between FIG. 11(f) and FIG. 13(f), according to the control apparatus of the present invention shown in FIG. 9, variations in the averages of the terminal voltages of the respective phase windings are restrained and the time during which the variation width of the above described average goes out of V/2 is shortened.

As is clear from the above described explanations, the motor control apparatus according to each of the above described embodiments is applied to a motor having a plurality of independent phase windings and controls the plurality of phase windings by dividing them into on set of phase windings and the other set of phase windings.

That is, the PWM control section corresponding to the drive section related to one set of phase windings and the PWM control section corresponding to the drive section related to the other set of phase windings control the motor by executing a switching sequence so as to connect at least one end of all windings included in the other set to the negative side of the power supply when both ends of at least one phase winding included in one set are connected to the positive side of the power supply and connect at least one end of all phase windings included in the other set to the positive side of the power supply when both ends of at least one phase winding included in the one set are connected to the negative side of the power supply.

The motor control apparatus according to each of the above described embodiments can also be applied to control of various types of motor having a plurality of independent phase windings, for example, a stepper motor, brushless motor or induction motor.

Furthermore, the above embodiments perform current control of the motor using an analog circuit, but it is also possible to adopt a configuration which performs current control by a digital circuit using a microprocessor such as a CPU.

What is claimed is:

1. A motor control apparatus applied to a motor having a plurality of independent phase windings for controlling the plurality of phase windings by dividing the phase windings into one set of windings and another set of windings, comprising:

a plurality of inverter type drive means for driving the respective phase windings; and a plurality of PWM control means for PWM-controlling the respective inverter type drive means, wherein each of the PWM control means is configured so as to execute a switching sequence in which the corresponding inverter type drive means can assume a condition of applying a voltage of a power supply to both ends of the phase winding according to the drive means, a condition of connecting both ends of the phase winding to the positive side of the power supply and a condition of connecting both ends of the winding to the negative side of the power supply, and further the PWM control means corresponding to the drive means according to the one set of phase windings and the PWM control means corresponding to the drive means according to the other set of phase windings are configured so as to set a mutual phase relationship of switching sequence so as to connect at least one end of all phase windings included in the other set to the negative side of the power supply when both ends of at least one phase winding included in the one set are connected to the positive side of the power supply during a first time period and connect at least one end of all the phase windings included in the other set to the positive side of the power supply when both ends of at least one phase winding included in the one set are connected to the negative side of the power supply during a second time period.

2. The motor control apparatus according to claim 1, wherein each of the respective inverter type drive means comprises a first and second switching elements interposed between one end of a corresponding phase winding and a positive electrode and a negative electrode of the power supply and a third and fourth switching elements interposed between the other end of the phase winding and the positive electrode and the negative electrode of the power supply.

3. The motor control apparatus according to claim 2, wherein of the respective PWM control means, the PWM control means corresponding to the inverter type drive means that drives the one set of phase windings is configured so as to control the first and second switching elements based on a comparison between a deviation of the current value of the phase winding corresponding to a current command and a first reference triangular wave and control the third and fourth switching elements based on a comparison between the deviation of the current value of the phase winding and a second reference triangular wave having a phase shift of 180 degrees from the first reference triangular wave, and of the respective PWM control means, the PWM control means corresponding to the inverter type drive means that drives the other set of phase windings is configured so as to control the first and second switching elements based on a comparison between the deviation of the current value of the phase winding corresponding to the current command and the second reference triangular wave and control the third and fourth switching elements based on a comparison between the deviation of the current value of the phase winding and the first reference triangular wave.

4. The motor control apparatus according to claim 2, wherein the motor comprises two or more phase windings.

5. The motor control apparatus according to claim 3, wherein the motor comprises two or more phase windings.

6. The motor control apparatus according to claim 1, wherein the motor comprises two or more phase windings.

* * * * *

UNITED STATES PATENT AND TRADEMARK OFFICE
CERTIFICATE OF CORRECTION

| | |
|---|---|
| PATENT NO. | : 7,786,690 B2 |
| APPLICATION NO. | : 11/840820 |
| DATED | : August 31, 2010 |
| INVENTOR(S) | : Hoda |

It is certified that error appears in the above-identified patent and that said Letters Patent is hereby corrected as shown below:

<u>Column 6</u>
Line 22, "positive side also called" should read --positive side (also called--.

<u>Column 10</u>
Line 43, "claim 2," should read --claim 1--;
Line 45, "claim 3," should read --claim 2--;
Line 47, "claim 1," should read --claim 3--.

Signed and Sealed this
Twentieth Day of March, 2012

David J. Kappos
*Director of the United States Patent and Trademark Office*